United States Patent
Rovera

(10) Patent No.: US 6,530,819 B1
(45) Date of Patent: Mar. 11, 2003

(54) ARTIFICIAL HONEYCOMB FOR BEEHIVES

(76) Inventor: Giuseppe Rovera, Via G.Macchi 85, Varese (IT)

( * ) Notice: Subject to any disclaimer, the term of this patent is extended or adjusted under 35 U.S.C. 154(b) by 0 days.

(21) Appl. No.: 09/677,415

(22) Filed: Oct. 2, 2000

(30) Foreign Application Priority Data

Oct. 5, 1999 (IT) ............................................ BS99U0093

(51) Int. Cl.⁷ .............................................. A01K 47/04
(52) U.S. Cl. ........................................................ 449/44
(58) Field of Search ............................... 449/42, 43, 44

(56) References Cited

U.S. PATENT DOCUMENTS

| | | | | |
|---|---|---|---|---|
| 1,773,221 A | * | 8/1930 | Davis | 449/42 |
| 1,882,938 A | * | 10/1932 | Root | 449/44 |
| 3,105,978 A | * | 10/1963 | Krekel | 449/44 |
| 3,231,907 A | * | 2/1966 | Covington | 449/43 |
| 3,758,896 A | * | 9/1973 | Croan | 449/43 |
| 3,806,969 A | * | 4/1974 | Varama | 449/42 |
| 3,864,196 A | * | 2/1975 | Schmidt | 449/44 |
| 4,663,791 A | * | 5/1987 | NIshi | 449/2 |
| 4,992,073 A | * | 2/1991 | Levy et al. | 449/44 |

* cited by examiner

Primary Examiner—Robert P. Swiatek
(74) Attorney, Agent, or Firm—McGlew and Tuttle, P.C.

(57) ABSTRACT

An artificial honeycomb for hives with a body created from plastic material. The body has a multiplicity of hexagonal small cells, on one or both sides of a dividing film. The dividing film acts as a common base for all the small cells. The hexagonal small cells on one side of the dividing wall may be off-set with respect to the small cells on the other side of the dividing wall. The hexagonal small cells may be inclined horizontally. The honeycomb structure may be equipped with a border or an integral or fitted on perimeter frame. A substance compatible with the bees and one attractive to them may be applied to the small cells.

10 Claims, 3 Drawing Sheets

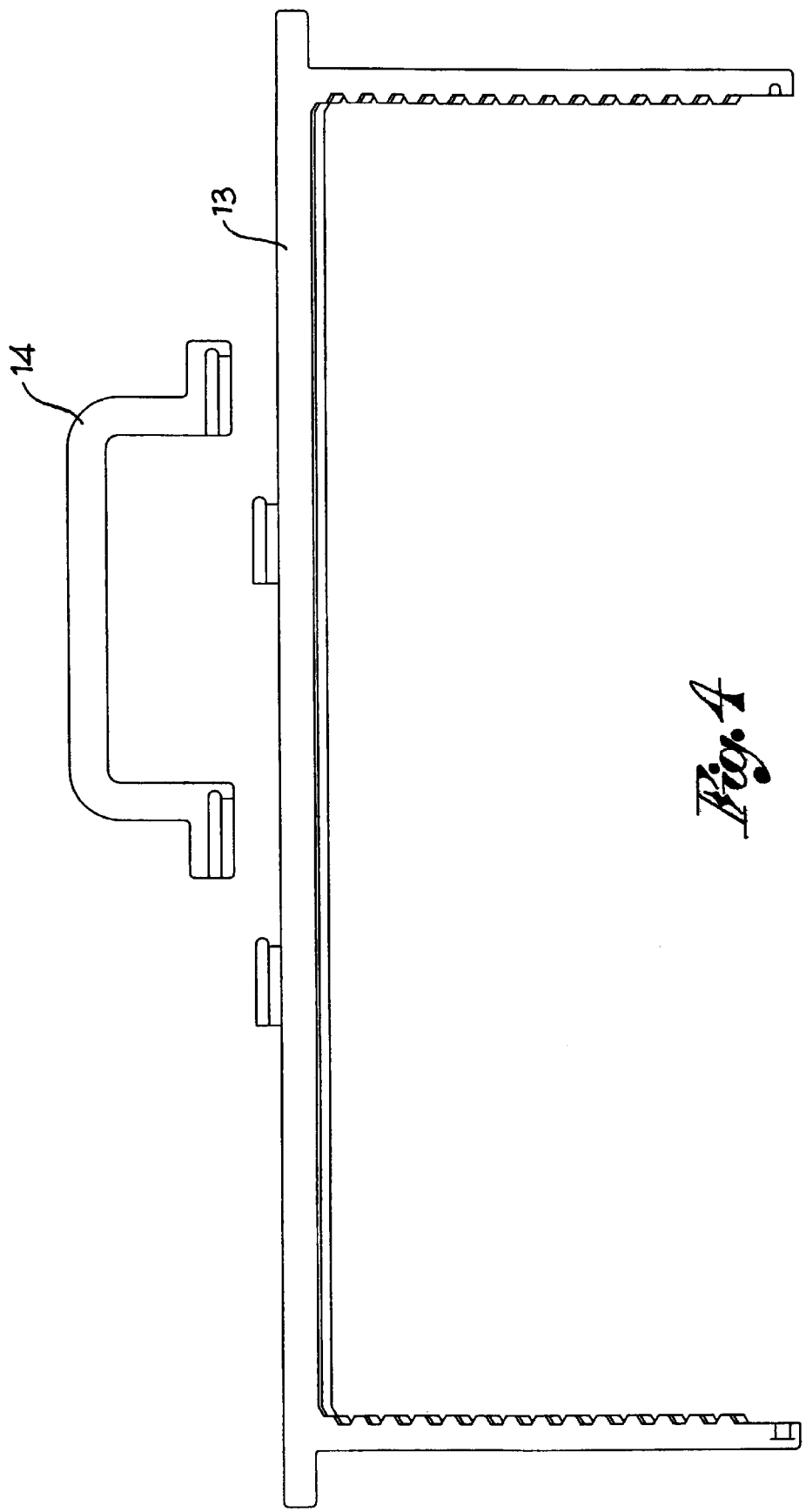

ARTIFICIAL HONEYCOMB FOR BEEHIVES

FIELD OF THE INVENTION

This invention concerns bee-keeping and beehives in particular.

BACKGROUND OF THE INVENTION

Bees are essentially kept for the use of the honey and wax they produce. Bee-keeping is generally practiced in box shaped hives, in which the bees progressively build the honeycombs of their hives.

The honeycomb is a group of hexagonal wax cells in which the worker bees deposit the honey and pollens and where the queen bee lays her eggs for the growth of new bees. To facilitate the construction of the honeycombs, the hives are arranged with mobile frames. Nevertheless, the only function of these frames is to support the honeycombs and to enable their removal.

The bees have to construct the cells of the honeycombs and then keep them intact, by repairing them by producing wax deriving from a chemical transformation of honey and pollens. It is therefore clear that the construction of honeycombs requires a considerable amount of work and of product on the part of the insects. Furthermore the honeycombs wear and break easily, due to their fragility when the honey is collected. In this way, the insects must then re-build or repair them.

SUMMARY AND OBJECTS OF THE INVENTION

The purpose of this invention is to supply an artificial honeycomb, in other words a complex of solid, self-supporting cells that can be inserted as such into the hives, immediately available to the bees without having to construct it themselves: this complex would be re-useable, long-lasting and capable of simplifying and facilitating the collection of useful hive products.

The purpose is reached in the invention with an artificial honeycomb made of heat-formed, or better, moulded plastic, with a high number of hexagonal cells at least on one side, but preferably on both sides, with a dividing film acting as a base for the cells. Each honeycomb can be integral or later fitted with a border or frame for insertion on site into the hives and for handling.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 4 shows a honeycomb support frame that can be fitted with a handle.

DESCRIPTION OF THE PREFERRED EMBODIMENTS

Figure 1:
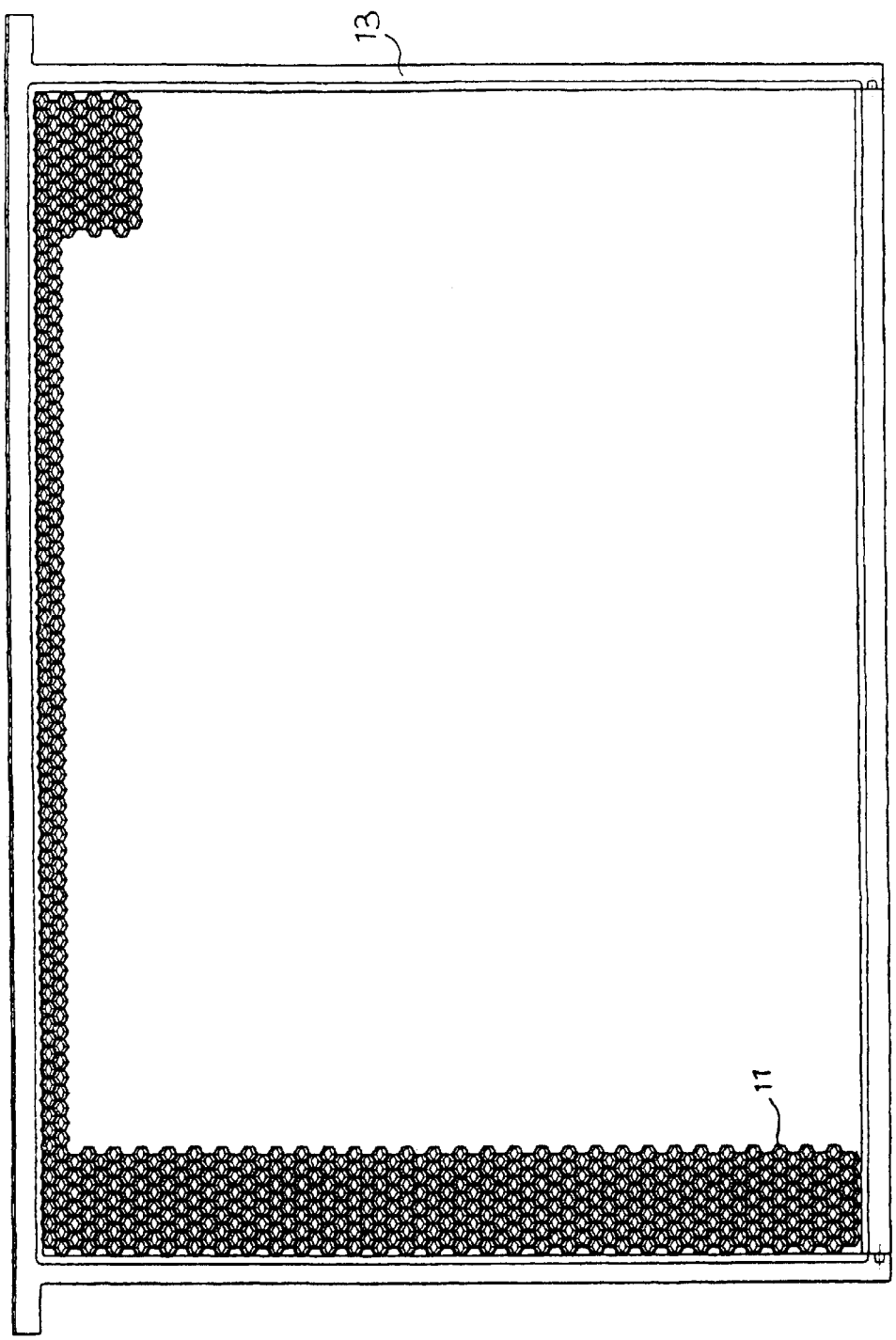
FIG. 1 shows part of a framed honeycomb.
Figure 2:
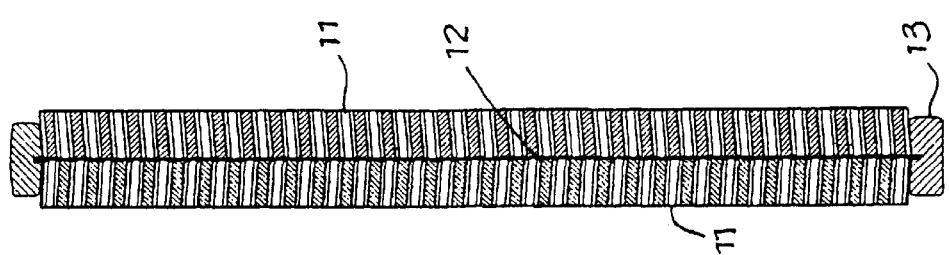
FIG. 2 shows its transverse section.
Figure 3:
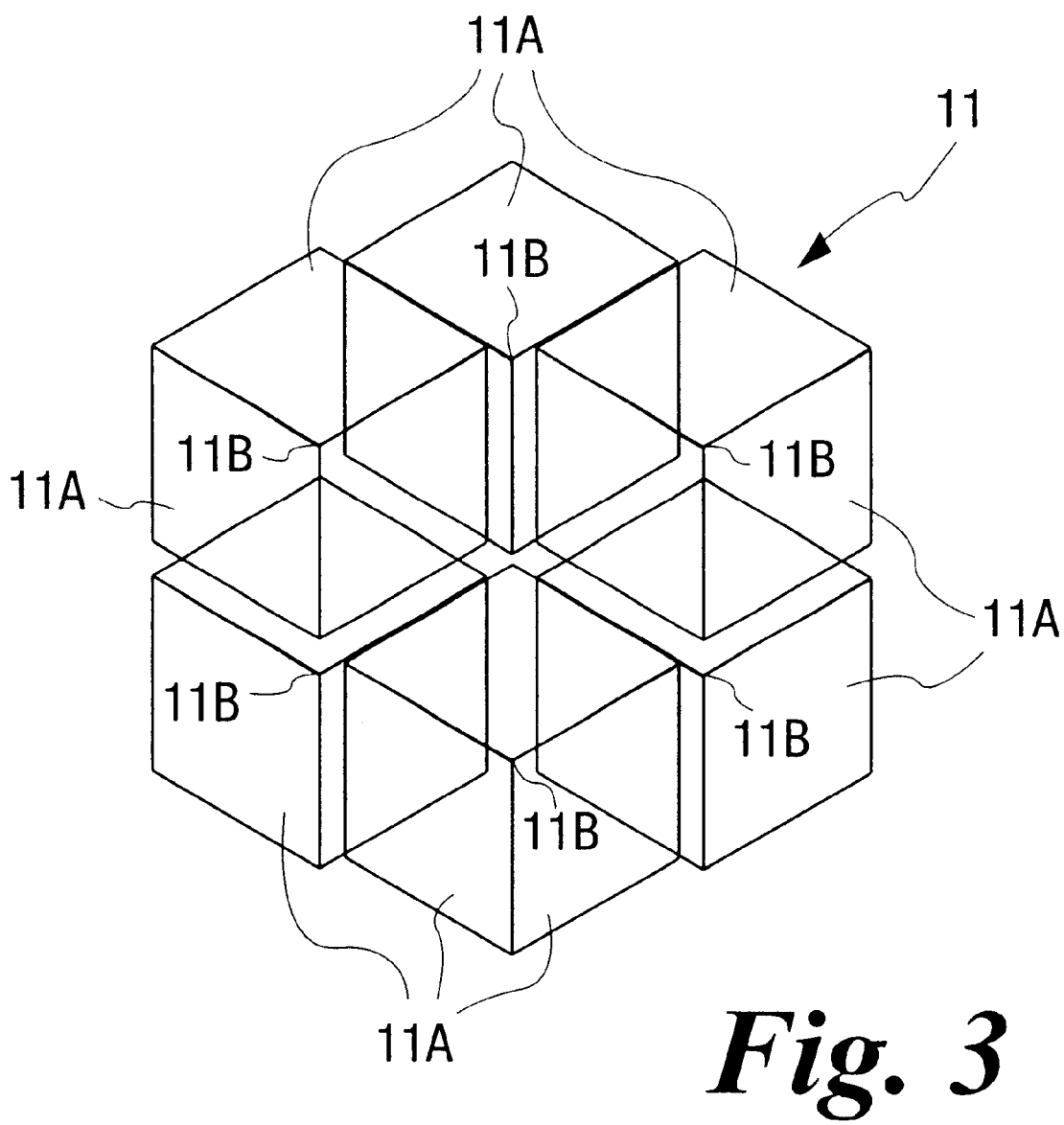
FIG. 3 shows an enlarged view of several small cells.

As represented, the artificial honeycomb includes a complex of hexagonal small cells, preferably on either side of a dividing film wall 12 which acts as the base for the small cells. The base of the hexagonal cells taper to a point and are formed from three substantially flat rhombic shaped surfaces or panels 11A meeting in a vertex 11B at a substantially center point of a respective hexagonal cell. The small cells 11 on one side of the dividing wall 12 are off-set with respect to those on the opposite side—FIG. 2—which permits greater consistency and strength of the honeycomb structure. The rhombic shaped surfaces 11A on each side of the wall 12 can then be arranged complementary. Furthermore, all the small cells are inclined horizontally, reproducing the same arrangement as the small cells of honeycombs constructed directly by the bees.

The honeycomb is obtained from a suitable plastic material of an appropriate thickness both in the small cell walls and the dividing wall. A frame, 13, usually rectangular in shape and in various sizes, can be formed or applied around the honeycomb to support the honeycomb when inserted into a hive and to facilitate its handling. The frame 13 can also be fitted with a handle for gripping 14 which can be attached via notch, for example—see FIG. 4.

In use, the honeycomb can be coated with a substance that favours the bees' access into the small cells and to collect the honey the honeycomb can be taken out, comfortably handled and possibly heated without the risk of breaking it so as to enjoy continuous use.

While specific embodiments of the invention have been shown and described in detail to illustrate the application of the principles of the invention, it will be understood that the invention may be embodied otherwise without departing from such principles.

What is claimed is:

1. An artificial honeycomb for hives characterized by a body created from a plastic material with a multiplicity of hexagonal small cells on one side and a dividing film acting as a common base for all the small cells, a base of said hexagonal cells tapering to a point and being formed from three substantially rhombic shaped surfaces meeting in a vertex at a substantially center point of a respective said hexagonal cell, the hexagonal small cells being on both sides of the dividing film and being off-set with respect to the small cells on the opposite side.

2. An artificial honeycomb according to claim 1 in which the hexagonal small cells are inclined horizontally.

3. An artificial honeycomb according to claim 2, equipped with a border integral on a perimeter frame.

4. An artificial honeycomb according to claim 1, equipped with a border fitted on a perimeter frame.

5. An artificial honeycomb according to claim 4 where a substance compatible with the bees and one attractive to them is applied to the small cells.

6. An honeycomb in accordance with claim 1, wherein:
each of said hexagonal cells have longitudinal sides;
two edges of each of said rhombic shaped surfaces are in common with edges of two said longitudinal sides of said respective hexagonal cell.

7. An honeycomb in accordance with claim 6, wherein:

said two edges of each of said rhombic shaped surfaces are in common with edges of two other said rhombic shaped surfaces of said respective hexagonal cell.

8. An honeycomb in accordance with claim 1, wherein:

two edges of each of said rhombic shaped surfaces are in common with edges of two other said rhombic shaped surfaces of said respective hexagonal cell.

9. An honeycomb in accordance with claim 1, wherein:

said plurality of substantially hexagonal cells extend from both sides of said film, said plurality of substantially hexagonal cells extending from one side of said film are offset with respect to said plurality of substantially hexagonal cells extending from another side of said film.

10. An honeycomb in accordance with claim 9, wherein:

said rhombic shaped panels of said plurality of substantially hexagonal cells extending from said one side of said film are arranged complementary with said rhombic shaped panels of said plurality of substantially hexagonal cells extending from said another side of said film.

\* \* \* \* \*